US011980902B2

(12) United States Patent
Sullivan et al.

(10) Patent No.: US 11,980,902 B2
(45) Date of Patent: May 14, 2024

(54) EQUALIZATION OF NOZZLE PERFORMANCE FOR SPRAYERS

(71) Applicant: DEERE & COMPANY, Moline, IL (US)

(72) Inventors: Dennis J. Sullivan, Ankeny, IA (US); Richard A. Humpal, Ankeny, IA (US)

(73) Assignee: DEERE & COMPANY, Moline, IL (US)

( * ) Notice: Subject to any disclaimer, the term of this patent is extended or adjusted under 35 U.S.C. 154(b) by 610 days.

(21) Appl. No.: 17/034,627

(22) Filed: Sep. 28, 2020

(65) Prior Publication Data

US 2021/0008582 A1 Jan. 14, 2021

Related U.S. Application Data

(62) Division of application No. 14/880,303, filed on Oct. 12, 2015, now Pat. No. 10,786,826.

(60) Provisional application No. 62/197,938, filed on Jul. 28, 2015, provisional application No. 62/094,538, filed on Dec. 19, 2014.

(51) Int. Cl.
*B05B 12/00* (2018.01)
*A01M 7/00* (2006.01)
*B05B 1/20* (2006.01)
*B05B 13/00* (2006.01)

(52) U.S. Cl.
CPC ......... *B05B 12/008* (2013.01); *A01M 7/0042* (2013.01); *A01M 7/0089* (2013.01); *B05B 1/20* (2013.01); *B05B 13/005* (2013.01)

(58) Field of Classification Search
CPC ... B05B 12/006; B05B 12/008; B05B 12/004; B05B 13/005; B05B 1/20; A01M 7/0089; A01M 7/0042
See application file for complete search history.

(56) References Cited

U.S. PATENT DOCUMENTS

| 4,530,465 | A |   | 7/1985 | Gauchet et al. |
| 4,803,626 | A |   | 2/1989 | Bachman et al. |
| 5,207,381 | A |   | 5/1993 | Gill |
| 6,132,511 | A | * | 10/2000 | Crum ..................... B05B 12/04 118/308 |
| 6,230,091 | B1 | * | 5/2001 | McQuinn ............. A01B 79/005 700/282 |

(Continued)

FOREIGN PATENT DOCUMENTS

JP 2002034422 A 2/2002

OTHER PUBLICATIONS

Australian Search Report issued in Patent Application No. 2021201391, dated Feb. 24, 2022, in 06 pages.

(Continued)

*Primary Examiner* — Tuongminh N Pham

(57) ABSTRACT

A method of equalizing a spray system for an agricultural sprayer includes measuring an output flow rate or fluid pressure for one or more nozzles on a boom assembly, determining an amount of tilt of the boom assembly with respect to a reference frame, and associating the amount of tilt with the output flow rate or fluid pressure for each of the one or more nozzles. The method also includes determining tilt-updated flow settings for the spray system based on the output flow rate or fluid pressure and storing the tilt-updated flow settings in a spray profile for later use during a spray operation.

7 Claims, 5 Drawing Sheets

(56) References Cited

U.S. PATENT DOCUMENTS

| | | | |
|---|---|---|---|
| 7,311,004 | B2 | 12/2007 | Giles |
| 7,502,665 | B2 | 3/2009 | Giles et al. |
| 8,523,085 | B2 | 9/2013 | Grimm et al. |
| 2004/0173019 | A1 | 9/2004 | McMillan et al. |
| 2004/0211253 | A1 | 10/2004 | Horie et al. |
| 2007/0295083 | A1 | 12/2007 | Kawai |
| 2009/0112372 | A1 | 4/2009 | Peterson |
| 2011/0266365 | A1 | 11/2011 | Hrnicek et al. |
| 2011/0282554 | A1 | 11/2011 | Keye |
| 2012/0168530 | A1 | 7/2012 | Ellingson et al. |
| 2013/0153676 | A1* | 6/2013 | Ballu ............... A01C 23/007 239/11 |
| 2014/0195948 | A1 | 7/2014 | Magidow |

OTHER PUBLICATIONS

Canadian Office Action issued in Patent Application No. 2913278, dated Apr. 8, 2022, in 04 pages.

Sprayer Setup and Calibration, Fuse Technologies. Product web page [online]. AGCO Corporation, 2015 [retrieved on Oct. 12, 2015]. Retrieved from the Internet: <http://www.agcotechnologies.com/support-and-training/article/agcontrol-sprayer-setup-calibration/>.

Porter, Wesley M. et al., Laboratory Evaluation of a Turn Compensation Control System for a Ground Sprayer. Jul. 2013. ASABE Annual International Meeting Paper, No. 131562442 (15 pages), [retrieved on Oct. 12, 2015]. Retrieved from the Internet: <http://elibrary.asabe.org/azdez.asp?JID=5&AID=43356&CID=miss2013&T=2>.

Buhler, PH. D, Wayne, Crop Protection Association of North Carolina. Calibrating a Boom Sprayer. Caring for Your Environment: Tips on working Safely with Pesticides in North Carolina. [retrieved on Jun. 24, 2015]. Retrieved from the Internet: <http://www.nccropprotection.org/FactSheets/Calibrating_boom_sprayer.pdf>.

Andersen, P.G.; Jorgensen, M.K., Calibration of Sprayers. Third European Workshop on Standardised Procedure for the Inspection of Sprayers, SPISE 3, Brno, Sep. 2009. Greve, Denmark. [retrieved on Oct. 12, 2015] Retrieved from the Internet: <http://pub.jki.bund.de/index.php/JKA/article/viewFile/270/230>.

* cited by examiner

EQUALIZATION OF NOZZLE PERFORMANCE FOR SPRAYERS

RELATED APPLICATIONS

This application is a divisional of U.S. patent application Ser. No. 14/880,303 filed Oct. 12, 2015. U.S. patent application Ser. No. 14/880,303 claims priority to U.S. Provisional Patent Application Ser. No. 62/094,538, filed Dec. 19, 2014, and titled, FLUID FLOW MONITORING SYSTEM, the contents of which are incorporated herein by reference. U.S. patent application Ser. No. 14/880,303 also claims priority to U.S. Provisional Patent Application Ser. No. 62/197,938, filed Jul. 28, 2015, and titled, EQUALIZATION OF NOZZLE PERFORMANCE FOR SPRAYERS, the contents of which are incorporated herein by reference.

This patent application incorporates by reference U.S. patent application Ser. No. 14/505,944, filed Oct. 3, 2014, and titled, BROADBAND SPRAY NOZZLE SYSTEMS AND METHODS. This patent application also incorporates by reference U.S. patent application Ser. No. 14/506,057, filed Oct. 3, 2014, and titled, HYBRID FLOW NOZZLE AND CONTROL SYSTEM.

FIELD OF THE DISCLOSURE

This disclosure relates generally to sprayers for spreading or spraying material (for example, liquids), including the equalization of a flow rate from the nozzles for such sprayers in an agricultural environment.

BACKGROUND

Large system sprayers apply nutrients, herbicides, paints, chemicals, water, solvents and other liquids such as those used in the agriculture or manufacturing industries. The sprayers have booms and fluid distribution pipes that have attached multiple nozzles through which the liquids are released. Different farmers and operators use different sprayer systems (e.g., nozzles attached to telescoping or articulated booms), many of which include over 50 to 150 nozzles on the booms.

Modern agricultural sprayers include self-propelled spray vehicles or tractor-towed implements that carry the tanks filled with the fluid to be released through the nozzles. The vehicles travel over many different types of terrain, hilly, flat, cultivated or uncultivated fields.

There are different types of fluids being released, viscous and non-viscous, cold or warm. There may be more than one type of fluid released from the nozzles in a direct injection system. Also, the nozzles release fluid in different modes, continuously or in a pulsed fashion.

SUMMARY

Various aspects of example embodiments of an equalization system for spray nozzles are set out below and in the claims. In one embodiment, material flows from a reservoir of an agricultural sprayer along flow conduits arranged along a boom assembly to, and out of, various nozzles. For each of the nozzles, a respective flow indicator is determined corresponding to the flow of material from the reservoir to the respective nozzle. Deviations from a target outflow rate are determined based upon a comparison of the flow indicators and corresponding reference values. For each of the nozzles, a respective flow control parameter is determined based upon the determined deviation from the target outflow rate. Corrections are applied to each nozzle based on a variety of factors such as the measured terrain, fluid flow rate, pressure and so on. Nozzles having pulsed nozzle fluid flow adjust the conditions dynamically or prior to startup.

In another embodiment, an amount of tilt of a boom assembly of an agricultural sprayer is determined, with respect to a reference frame such as the ground. Based upon the determined amount of boom tilt or tilt for each boom section, at least one updated flow control parameter is determined corresponding to the output flow rate for at least one of the nozzles. The at least one updated outflow rate is different from a predetermined or expected output flow rate for the at least one of the nozzles. Updated flow settings is determined based upon the at least one updated flow control parameter and implemented, at least partly in place of the predetermined flow settings, in order to implement a corresponding tilt-updated spray profile.

BRIEF DESCRIPTION OF THE DRAWINGS

The detailed description refers to the following example figures that may not be drawn to scale.

DETAILED DESCRIPTION

Figure 1:
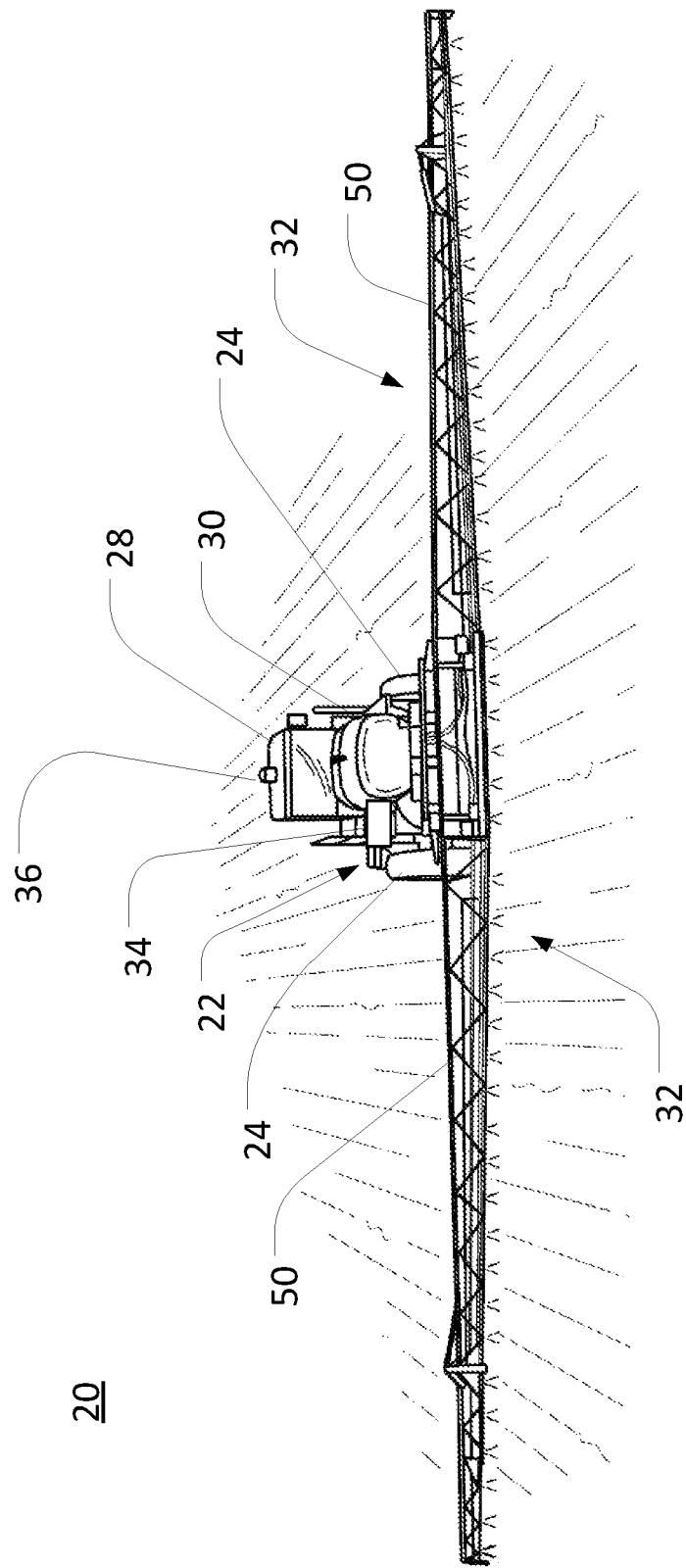
FIG. 1 is a perspective view of an embodiment of an example agricultural sprayer or fluid applicator.

This disclosure provides example embodiments of an equalization system for spray nozzles so that they release fluid uniformly or that the end result is effectively uniform. An example equalization system controls a sprayer to apply (e.g., distribute or disperse) various materials in a relatively controlled manner. In agricultural settings, a spray boom is mounted on traveling vehicles. Long booms such as over 40 meters support long fluid distribution pipes ("plumbing") that have outlets each associated with 100 or more spray nozzles attached to the pipes. Farmers use very different boom configurations and many different nozzle types. Pulse width modulated spray controlled nozzles such as described in U.S. Provisional Patent Application Ser. No. 62/094,538 is able to control and indirectly measure fluid flow rate or fluid pressure for each individual nozzle. The measured fluid flow rate in each nozzle may differ depending on the plumbing configuration, pressure drop variances, terrain, fluid type, chemical sediment/buildup, nozzle wear, and nozzle attachment point, and so on; the different measured values are stored and analyzed. For example if a target flow rate of 1 liter per minute is desired from each nozzle, each individual nozzle's offset is the difference between its measured flow rate and the target flow rate. Other example target flow rates include an average value for the flow rate among all of the nozzles when the spray system is operated in some manner (e.g. a fixed pressure at the center of the plumbing). Alternatively, rather than making measurements, a distribution can be determined and level setting (equalization) achieved at the factory for popularly-used or certain boom and plumbing (e.g. hose diameter) configurations based on at least on the geometry of the boom, plumbing and nozzles (e.g. the distance between each nozzle for a short boom versus a longer boom). Another alternative, a fluid catch distribution test is performed to measure the fluid flow, and an operator stores the measured fluid flow into an equalization monitoring (e.g. screen) system or database for later use. Another alternative includes pressure measurements either at different sections of the boom (e.g. at the section valves) or at the individual nozzles (e.g. nozzle tip, which could be used to remove the variance among the nozzles or nozzle tips. The distribution in the data versus a target flow rate for a given plumbing configuration is used to develop default mathematical offsets from the measured average value (or some other desired value) for the fluid flow out of each nozzle. Such spray profiles of deviations and offsets for each nozzle for a particular boom configuration are stored in a memory circuit and later used to adjust the pulse width modulation that controls the magnitude of fluid flow during actual operation of the spray vehicle in the field. For example, a vehicle's computer identifies the particular spray profile corresponding to that vehicle and geometry of the boom and nozzles; then if a measured fluid flow in one nozzle is, for example, systematically lower than the target value for that particular nozzle, the pulse width controlling the fluid release valves for that nozzle can be incremented to increase the amount of fluid released. By doing so, the distribution in the fluid flow is equalized across the entire boom. This equalization adjustment is added on top of the global adjustment to vary the fluid through the plumbing in order to maintain a certain fluid pressure or droplet size for spray released from each nozzle. Although the discussion refers to agricultural sprayers, industrial sprayers also benefit from this disclosure; and the reference frame may be with respect to a target surface (e.g. airplane being painted) rather than to the ground or crop field. In addition, although pulse width signals are discussed, other types of signals that control the fluid flow rate may be substituted.

In some embodiments, rather than equalize all the individual spray nozzles, sections of spray nozzles are equalized. The spray booms are often articulated and have ten or more sections. One method is to equalize the nozzles within each section. Another method is to assess an average performance among all the nozzles in one section. Then different sections are equalized with respect to each other. This more coarse technique reduces computation time and electronic resources, but each individual nozzle is not necessarily optimized for its output flow rate. Example electronic circuits to perform flow rate detection and calibration are described in U.S. Provisional Patent Application Ser. No. 62/094,538.

In some embodiments, height-level sensors and proximity, accelerometers and gyroscope sensors are mounted on each section of the boom. The sensors measure a distance to the ground or a side hill so that the tilt of the boom or boom sections with respect to the ground is detected or determined from pressure variations. When there is uneven ground or a hill, there is a fluid pressure differential from one end of the boom to the other end. For example, the difference may be as much as 1.3 psi per 3 feet. For a 150 feet boom, that entails a difference of 11 psi for a 10 degree boom roll angle. It is useful to apply side hill compensation to equalize the 40 psi across the boom length. An initial equalization is performed at the factory or at the farm site by assuming flat ground. But moving the boom sections (i.e. by folding, tilting and rotating the boom sections) creates the effect of hilly or uneven terrain at the manufacturing site or at the farm site even though the spray vehicle itself is in fact stationary on a flat surface. Calibration and equalization are performed for different boom configurations under the different simulated terrains, to determine a set of "hilly" offsets (e.g. flow rate offsets) that are stored in a lookup table in a manner like this: terrain versus flow rate for each nozzle. Afterwards, when the spray vehicle is actually traveling on hilly terrain or uneven ground, the hilliness or tilt of the boom is measured and compared or matched with the terrain values in the lookup table. The flow rate offset associated with the identified terrain values are used to correct or adjust the default pulse width signal that controls the amount of fluid flow in each nozzle or boom section. In this manner, the entire equalization procedure does not need to be re-performed dynamically while the spray vehicle is traveling. Instead, the simulated values are used along with the terrain sensors to determine the appropriate pulse width adjustment to equalize the performance of the nozzles or nozzle sections.

Equalization of a spray system or subsystem (e.g., a boom section of a sprayer) with multiple nozzles includes the determination of a spray profile for the system or subsystem, where the spray profile indicates a set of respective target outflows for the respective nozzles. For example, initial equalization of a sprayer system may include determining default target outflows for each nozzle (or a subset of nozzles) of the sprayer system. Likewise, in-field equalization of a sprayer system may include determining adjusted target outflows for each nozzle (or a subset of nozzles) of the sprayer system. The spray profile for an array of nozzles includes collective material outflow characteristics for the array. For example, a uniform spray profile may include substantially equal outflow rates for each nozzle in an array. Similarly, a non-uniform spray profile may include a distribution of different outflow rates for different nozzles of an array.

FIG. 1 depicts an example agricultural sprayer 20 featuring a chassis frame 22 supported off the ground by large-diameter, ground-engaging wheels 24. The frame 22 supports an engine compartment (not shown), an operator cabin 28, and a reservoir shown as a supply tank 30, and a boom assembly 32. As depicted, the boom assembly 32 includes right- and left-side boom sections extending away from the chassis 22, as well as a central boom portion behind the supply tank 30. Alternative spray booms include configurations with segmented, articulating, or extendable booms on one or both sides of the frame 22. Various hydraulics components as well as solution-mixing and spray pumps and control hardware is carried onboard the chassis frame 22 as well. Fluid is electrically or hydraulically pumped from the reservoir to the spray boom. Fluid distribution pipes mounted to the spray boom receive the fluid. The fluid distribution pipe has many spray nozzles 60 located along the pipe. Usually, the nozzles 60 are located at measured intervals along the boom such as at 15 inches apart. There are holes or apertures along the distribution pipes that are mated to input openings in the spray nozzles 60. Fluid flows from the reservoir, past section valves to the spray nozzles 60; then the fluid is release-ably controlled by one or two valves inside the spray nozzles. When the valves inside the spray nozzles 60 are open, the fluid is released from the spray nozzles 60 to the ground. Examples spray nozzles 60 and their functionality are depicted in U.S. Provisional Patent Application Ser. No. 62/094,538.

An example spray controller 34 is configured as a computing device with associated processor devices and memory architectures, as a hard-wired computing circuit (or circuits), as a programmable circuit, as a hydraulic, electrical or electro-hydraulic controller, and so on. An example location for the controller 34 is depicted in FIG. 1. In some embodiments, the spray controller 34 is located at a central farm site or located remotely or on other sprayers 20 and sends electromagnetic signals wirelessly. The controller 34 is in electronic, hydraulic, or other communication with various other systems or devices on the sprayer 20, as well as with remotely located systems or devices. For example, the controller 34 is in electronic or hydraulic communication with various actuators, sensors, and other devices within (or outside of) the sprayer 20, including various device arrayed along the boom assembly 32. The controller 34 may communicate with other systems or devices (including other controllers) in various known ways, including via a CAN bus (not shown), via wireless communication means, or otherwise.

The sprayer 20 may further include various sensing devices, including various sensors, receivers, and so on. For example, the sensing devices of the sprayer 20 may include various pressure or flow sensors, as discussed in greater detail below, as well as a Global Positioning System ("GPS") device 36, which is in communication with the controller 34. The GPS device 36 is positioned at various locations on the sprayer 20 (or elsewhere). The GPS detects the locations of the sprayer 20 and can correlate or map an amount of uneven ground or boom tilt with the particular location in the field. Alternatively, the GPS detected location can be mapped to or correlated with the amount of flow rate for each of the nozzles or boom sections in a particular field location for a given flow pressure or amount of fluid released at the input of the fluid distribution pipes or plumbing.

The GPS device 36, or another sensing device (e.g., accelerometer or gyros), is configured to detect various parameters, including orientation information for the sprayer 20 or the boom assembly 32. For example, the GPS device 36 (or another sensing device) is configured to detect the tilt (e.g., pitch, roll, or yaw) of the sprayer 20 or the boom assembly 32, with respect to the reference orientation (e.g., the normal orientation of the sprayer 20 on level ground). In some embodiments, the GPS device 36 (or another sensor) may directly measure tilt for a particular system, such as by measuring the tilt of the sprayer 20 as a whole with various accelerometers or gyroscope assemblies. In some embodiments, the GPS device 36 (or another sensor) may indirectly measure tilt for a particular system, such as by directly measuring the tilt of the sprayer 20, then calculating (or providing data for the controller 34 to calculate) an associated tilt for the boom assembly 32. In some situations, additional sensor information is used to determine the relevant tilt. For example, information regarding the orientation of the boom assembly 32 relative to the sprayer 20 is provided to the controller 34 along with tilt information for the sprayer 20 as a whole (e.g., from the GPS device 36), and a corresponding tilt of the boom assembly 32 relative to a nominal reference frame determined.

The GPS device 36 refers to the collection of sensors that detect boom tilt relative to the ground. The GPS device 36 and other devices of the sprayer 20 (e.g., other sensing devices) operate with the controller 34 (or other devices) in various ways. In some embodiments, the various sensing (and other) devices may provide relatively unprocessed signals (e.g., raw currents or voltages) to the controller 34, based upon various detected parameters. In some embodiments, the GPS device 36 (or other devices) may provide the controller 34 with processed data (or vice versa). For example, the GPS device 36 may detect various signals and parameters, process the detected data into location coordinates, tilt angles (e.g., degrees of roll) and so on, then provide the processed data to the controller 34. In other examples, the GPS device 36 receives additional data to derive refined corrections (e.g. real time kinematic RTK satellite navigation).

In some embodiments, the controller 34 is integrated with the GPS device 36 or other devices (or vice versa), such that the one or more sensing (or other) devices and the controller 34 is viewed as a single sensing and processing device. For example, rather than the separate unit depicted in FIG. 1, the controller 34 is formed as a single unit with the GPS device 36 (or other devices).

Figure 2:
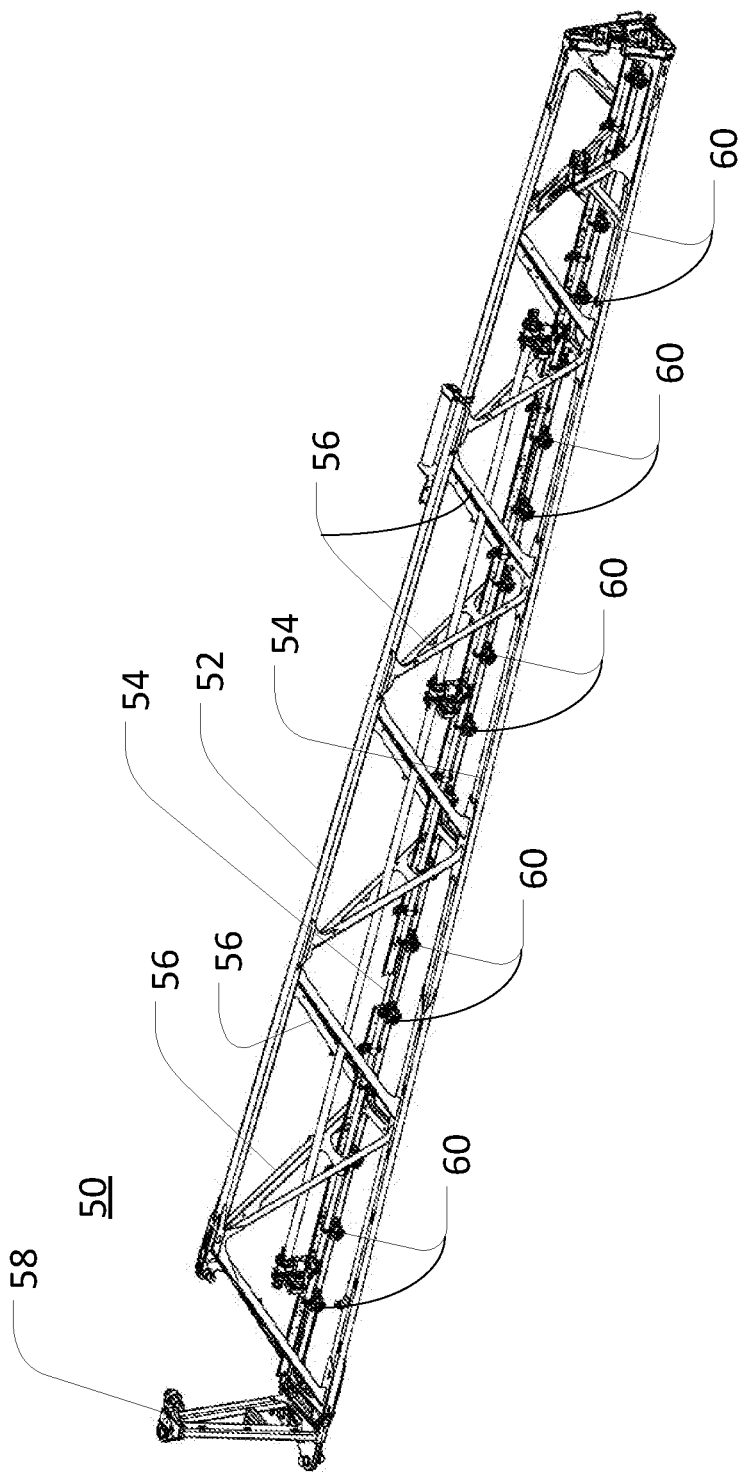
FIG. 2 is a perspective view of an example section of a boom assembly of the agricultural sprayer of FIG. 1.

The example boom assembly is a generally rigid framework of tubular or solid frame structures. Referring also to FIG. 2, for example, a section 50 (or other sections) of the boom assembly 32 includes upper and lower carriers 52 and 54 interconnected with numerous struts 56 forming a trussed arrangement. The boom assembly 32 may include several sections (e.g., sections of decreasing size moving outward), that are coupled together to extend in total to lengths of near or over 100 feet. The boom sections are interconnected with each other (or other features of the sprayer 20), and the boom sections 50 is connected to the chassis frame 22 via hinges 58 that facilitate folding of the boom assembly 32 into a position suitable for transportation and unfolding of the boom assembly 32 into an operating position, as shown in FIG. 1.

Hydraulic cylinders or other actuators may provide the motive force for hinging the boom sections between operating and transport positions. In some embodiments, sensors (not shown) may interact with the hydraulic cylinders (or other actuators) or the hinges 58 (or other components of the boom assembly 32) in order to determine a current orientation of particular boom sections (e.g., the boom section 50) with respect to the sprayer 20, with respect to each other, or with respect to other reference frames.

The example boom assembly 32 supports flow conduits on both sides of the sprayer 20 for routing of fluid from the supply tank 30 to various nozzles 60 arrayed along the length of the boom assembly 32 (including along the boom section 50). The flow conduits may generally be in communication with the supply tank 30 via various supply and return hoses (not shown), which, in the case of liquid material, supply and return liquid from and to the supply tank 30, as needed. Accordingly, material from the supply tank 30 (or other reservoirs) is pumped along appropriate flow conduits to the nozzles 60 for application of the material to a field.

In some embodiments, the nozzles 60 are electronically configured to be controlled via pulse-width modulation ("PWM") or by switching the spray nozzle to a different outlet on the spray nozzle. Under PWM control, control (or other) information is encoded via a pulsing signal, in which voltage or current is switched, relatively rapidly, between maximum (e.g., "on") and minimum (e.g., "off") values. The PWM signals control the opening and closing of valves in boom section valves, such that fluid flow to the nozzles 60 in each section is regulated and outflow from the nozzles 60 is controlled with relatively high precision. In some embodiments, individual nozzles 60 are controlled by PWM signals to open and close valves within the nozzles 60, such as depicted in U.S. Provisional Patent Application Ser. No. 62/094,538. Due to the different locations where the spray fluid may be controlled, the flow rate can be equalized either at the boom section level or at the individual nozzle level. In addition, although this Disclosure refers to pulsed signals, a solenoid valve may also be replaced by a ball valve controlled by analog or digital signals.

In some embodiments, the nozzles 60 are arranged along the boom section 50 (or elsewhere) in an array that varies from that depicted in FIG. 2. Other example physical arrangements include different numbers of nozzles or different spacing between the nozzles 60.

Figure 3:
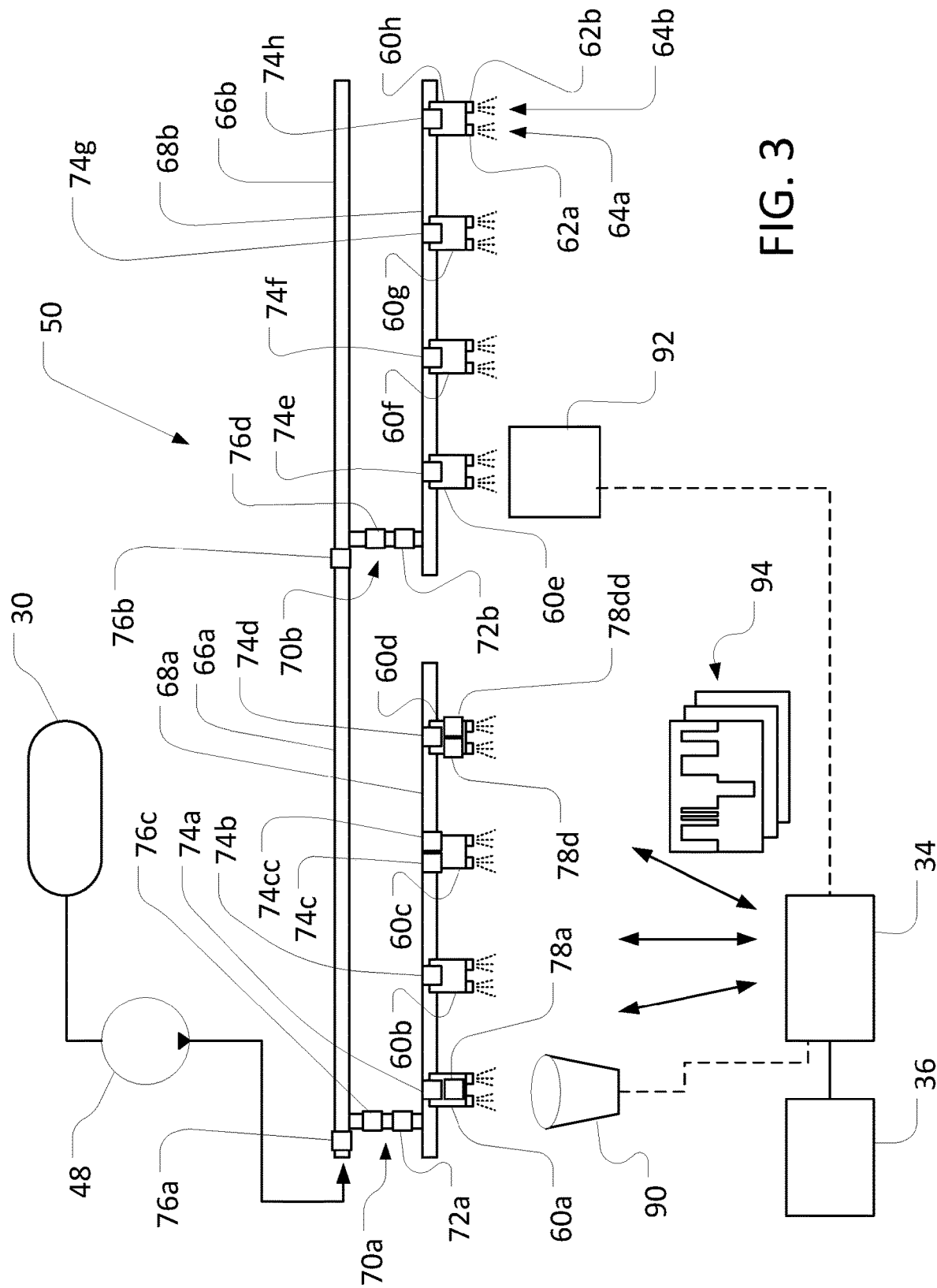
FIG. 3 is a schematic view of an example configuration of a spray system for use with the boom assembly of FIG. 2, and aspects of an equalization method for nozzles of the spray system.

In some embodiments, one or more of the nozzles 60 include multiple outlets, such that the relevant nozzles 60 distribute material with multiple spray patterns. For example, as depicted in FIG. 3, each of the nozzles 60 includes two outlets (e.g., outlets 62a and 62b of the nozzle 60h) that provide for two somewhat distinct spray patterns (e.g., spray patterns 64a and 64b) for fluid outflows through the respective outlets. In some embodiments, each nozzle in an array is configured with similar numbers and arrangements of outlets. In some embodiments, different nozzles in an array may support different outlet configurations. As such, for example, the spray profile of the collective array of nozzles 60 may differ in various ways from the spray profile depicted in FIG. 3. Having different outlets or different spray tips on the outlets allows the operator or the calibration software to switch to another outlet as a way to equalize the flow rate or fluid flow pressure.

In some embodiments, flow conduits for the sprayer 20 include, along with various nozzles, one or more feed pipes, one or more spray pipes, and various control valves. For example, referring also to FIG. 3, the boom section 50 includes two feed pipes 66a and 66b, of the same or varied length. As depicted, the feed pipes 66a and 66b are joined end-to-end to deliver material from the supply tank 30 (e.g., as received from a pump 48) to two (or more) spray pipes 68a and 68b of the same or varied length. In the example illustrated in FIG. 3, the inner spray pipe 68a includes four equally spaced spray nozzles 60a through 60d and the outer spray pipe 68c includes four equally spaced spray nozzles 60e through 60h. The spray pipes 68a and 68b may also be spaced apart end-to-end consistent with the spacing between the spray nozzles 60. The spray pipe 68a is coupled to the feed pipe 66a via a coupling assembly 70a, and the spray pipe 68b is coupled to the feed pipe 66b via a coupling assembly 70b. In some embodiments, each of the fluid feed pipes 66a and 66b and the spray pipes 68a and 68b is formed from a unitary tubular body (i.e., not an assembly), for example, formed as a continuous extruded body with no seams or breaks or a fabricated body with seams/breaks joined together to be essentially continuous.

In other embodiments, such as for direct injection, different numbers of spray pipes is fed by one or more feed pipes, or different numbers of nozzles is arranged on a spray pipe with different spacing. Similarly, other arrangements of flow conduits is used to route material from feed pipes to spray pipes, or to generally route material from a reservoir (e.g., the supply tank 30) to various nozzles (e.g., the nozzles 60). Nozzles for each spray pipe are equalized for each particular pipe. Direct injection entails different spray fluids or chemicals that may have different specific gravity or chemical density so that equalization constants may differ. Aside from direct injection, some embodiments entail point injection where each individual nozzle body may spray a different fluid. Then the equalization constants may differ from nozzle body to nozzle body in order to maintain a constant pressure or a flow rate from each nozzle body (ejecting the same fluid) to account for the different substances, along with differences in the orifices or location of the nozzle bodies along the boom.

FIG. 3 depicts example control valves and sensors used to regulate the outflow of material through the various nozzles 60. Control valves 72a and 72b are located on coupling assemblies 70a and 70b, respectively. Accordingly, closing either of the control valves 72a and 72b may restrict, and sometimes entirely prevent, flow of material from the feed pipes 66a and 66b to the spray pipes 68a and 68b, respectively. In some other embodiments, control valves are located at (or in relative close proximity) or inside the nozzles such that outflow through a particular nozzle is specifically controlled, at least in part, via control of a corresponding valve. As depicted in FIG. 3, for example, at least one respective control valve 74 (e.g., a control valve 74a) is located near an inlet to an associated one of the nozzles 60 (e.g., the nozzle 60a). In this way, for example, flow into and outflow from the nozzle 60a (or other nozzles) is controlled via operation of the valve 74a.

In some embodiments, multiple control valves is associated with a particular nozzle. For example, for a nozzle with multiple outlets (e.g., the nozzle 60c), a respective control valve (e.g., the control valves 74c and 74cc) is associated with each of the outlets. In this way, for example, outflow through a particular outlet of a multi-outlet nozzle (e.g., the nozzle 60c) is controlled relatively independently of outflow through other outlets.

In some embodiments, various sensors are arranged at different locations along certain flow conduits of the boom section 50. As depicted in FIG. 3, for example, sensors 76a and 76b are positioned to sense aspects of flow for the feed pipes 66a and 66b, respectively. Similarly, sensors 76c and 76d are located to sense aspects of flow for the coupling assemblies 70a and 70b, respectively. In some embodiments, for example, flow sensors (e.g. thermistors, pressure transducers, potentiometers, velocimeters, flapper valves) are located at (or in relative close proximity to) associated nozzles, such that aspects of flow for the nozzles is monitored relatively directly. As depicted in FIG. 3, for example, at least one of various sensors 78 (e.g., a sensor 78a) is located within (or near) an associated one of the nozzles 60 (e.g., the nozzle 60a) to detect flow characteristics for (and at) the nozzle 60a (or other nozzles).

In some embodiments, multiple sensors are associated with a particular nozzle. For example, for a nozzle with multiple outlets (e.g., the nozzle 60d), a respective sensor (e.g., sensors 78d and 78dd, respectively) is associated with each of the outlets. Then outflow through a particular outlet of a multi-outlet nozzle (e.g., the nozzle 60d) is controlled relatively independently of outflow through other outlets of the nozzle.

As an example, each of the valves 74 (or various subsets thereof) is in communication with the controller 34, such that signals from the controller 34 are used to control operation of the valves 74. The control valves 74 (or other valves) are configured in various ways, however, with respect to control effected by the controller 34 such as via PWM signals. Correspondingly, the controller 34 is configured to determine and output PWM signals for control of the valves 74.

In some embodiments, the controller 34 is configured to operate the valves 74 via full opening and closing of the valves 74, with flow through the valves 74 being regulated via the frequency and duration of the opening and closing, and of the intervening open and closed valve states. In some embodiments, the controller 34 may alternatively (or additionally) be configured to operate the valves 74 via partial opening and closing of the valves 74, with flow through the valves 74 being regulated via the degree of opening or closing of the valve 74 (as well as, potentially, the frequency and duration of the relevant commands and commanded valve states). In some embodiments, combinations of these types of control (or other control strategies) may also (or alternatively) be employed.

Example sensors 78 (or various subsets thereof) are also in communication with the controller 34, such that data from the sensors 78 is used by the controller 34 for control of the valves 74 (and other devices). In some embodiments, the sensors 78 are configured as pressure sensors, such that the sensors 78 may communicate data indicating fluid pressure at a particular location (e.g., at the inlet or outlet of a particular nozzle 60, at a location along a particular flow conduit, and so on). In some embodiments, the sensors 78 is configured as flow sensors, such that the sensors 78 may communicate data indicating flow rates at a particular location (e.g., at the inlet or outlet of a particular nozzle 60, at a location along a particular flow conduit, and so on). In some embodiments, the sensors 78 (or others) is configured (alone, or in combination) to provide both flow and pressure data, both of which is used for further operations.

It is useful to calibrate and then equalize flow through the various devices on the boom section 50 (or other portions of the boom assembly 32) to provide for relatively uniform rates of material outflow on each section of the farm field. In other instances, such equalization is useful for causing a deviation from uniform flow, as is useful to cause more material to flow from certain nozzles than others. In some embodiments, such equalization is made in a factory or maintenance setting, such as during an initial equalization of the spraying systems of the sprayer 20. In other implementations, such equalization is made during in-field operation, whether at power-up of the vehicle or boom. Alternatively, equalization is performed dynamically while the vehicle is traveling. Equalization algorithms include measuring flow rates out of each nozzle, calculating an average and then adjusting the PWM pulses so that all the flow rates out of each nozzle is the same as the average value to within for example 95%. The deviation from the average value can be recorded and stored in a memory device or circuit. Alternatively, a desired target value is substituted for the average value. And the measured deviation of the flow from the target value for each nozzle is recorded as an offset for each nozzle. Then during actual crop spraying, the PWM pulse widths on the flow valves are increased or decreased proportional to the offset from the desired value (e.g. average or target value). For instance, if the flow rate deviates to the high side, the duration can be decreased so that less fluid is released (note, the polarity of the signals do not matter). Adjusting the deviation from the equalized desired value is performed in addition to other adjustments for the fluid flow rate (such as to unilaterally adjust all the fluid droplet sizes). In other embodiments, instead of tuning each nozzle, section valve opening/closing may be adjusted to equalize fluid flow out of each spray boom section. These adjustments can be implemented in circuitry or in software and are either open loop or closed-loop adjustments. Closed loop adjustments include a feedback circuit that monitors (e.g. by sensor) the deviation or measured values from expected values.

In other example embodiments, each of the nozzles 60 is configured, respectively, with a single associated control valve and a single associated sensor, with multiple associated control valves and sensors, or with various combinations thereof. Similarly, as also noted above, different arrangements of the nozzles 60, the various flow conduits (e.g., the feed pipes 66a and 66b and the spray pipes 68a and 68b) or other components are possible.

Still referring to FIG. 3, in an example equalization (e.g., an in-factory equalization), fluid (e.g., a pesticide solution) is caused to flow from the supply tank 30 (or other reservoir) along the flow conduits of the boom assembly 32 such that the fluid flows to, and out of, the various nozzles 60. As depicted, for example, the pump 48 is operated to draw fluid from the supply tank 30 and, potentially, to mix the fluid from the supply tank 30 with other substances. The pressurized fluid may then flow into the feed pipes 66a and 66b, through the coupling assemblies 70a and 70b to the spray pipes 68a and 68b, and out of the various nozzles 60a through 60h.

Although the fluid flow rate has been discussed, other variables characterizing the fluid can also be substituted. As fluid is flowing through the system, at least one flow indicator is determined for each of the nozzles 60a through 60h (or a subset thereof). The fluid indicator includes an actual fluid flow rate, a fluid pressure, flow angle or other parameter of the nozzles 60a. A particular determined flow indicator may relate to one of the nozzles 60 such as an indicator of fluid pressure at the nozzle 60a, an indicator of flow rate into the nozzle 60a, or an indicator of an outflow rate for fluid being sprayed by the nozzle 60a. In some embodiments, a flow indicator for the nozzle 60a may include an indicator of fluid pressure upstream or downstream of the nozzle 60a (e.g., in the coupling assembly 70a), an indicator of flow rate at a location upstream of downstream of the nozzle 60a (e.g., in the coupling assembly 70a), or another indicator.

Flow indicators are determined in various ways. In some embodiments, various sensors 76 and 78 are used. For example, the sensor 78a is used to determine fluid pressure or flow rates for the nozzle 60a, sensors 78d and 78dd is used to determine fluid pressure of flow rates for respective outlets of the nozzle 60d, sensor 76c is used to determine fluid pressure or flow rates corresponding to each of the nozzles 60a through 60d, sensor 76d is used to determine fluid pressure or flow rates corresponding to each of the nozzles 60a through 60h, and so on. In some embodiments, data from multiple sensors is combined to generate a single (but potentially multi-variable) flow indicator for a particular nozzle. In some embodiments, multiple sensors may determine multiple respective flow indicators, which is combined or otherwise used in conjunction for an equalization operation.

In some embodiments, spray nozzle tips are equipped with wired or wireless signal pressure transducers to measure the pressure of the fluid released from each spray nozzle. By measuring and calibrating the nozzle tips would remove the variance in the spray tip orifices along the boom. The pulse width of the PWM signals controlling the fluid flow would then adjust the amount of fluid released from each nozzle body to equalize the fluid sprayed out to the targeted crops. The pressure calibration is performed either at the factory or in the field. When the vehicle is traveling through hilly terrain or if it is a windy day, the pressure in the fluid pipes varies or the apparent pressure (fluid flow released) varies. By performing dynamic pressure (or fluid flow rate) calibration on the go, the pulse width of the PWM signals are correspondingly adjusted to enable equalized fluid release along the entire boom. Aside from pressure, micro devices (e.g. MEM devices) can also be mounted near the nozzle tips to measure fluid flow rate.

In some embodiments, flow rate is determined based upon physical capture of fluid from fluid outflows of the various nozzles 60 ("catch distribution test"). As depicted in FIG. 3, for example, a receptacle 90 is placed successively below each nozzle 60 (or outlet therefrom) in order to capture fluid outflow from the relevant nozzle 60 (or outlet therefrom). The amount of fluid captured by the receptacle 90 over a known period of time may accordingly indicate an average outflow rate for the relevant nozzle 60 (or outlet therefrom). The amounts of captured fluid, or the outflow rates derived therefrom, may then be provided to the controller 34 in various ways (e.g., automatically, wirelessly, via manual input, and so on) for further processing. In some embodiments, multiple instances of the receptacle 90 is used, such that flow rates for multiple nozzles 60 is measured relatively simultaneously. In some embodiments, the receptacle 90 is moved successively between different nozzles 60 (e.g., on an automated cart (not shown)), such that flow rates for the nozzles 60 is determined in series.

In some embodiments, other devices are used to determine flow rate indicators relating to actual fluid outflows. As also depicted in FIG. 3, for example, a spray pattern generator 92 is used for pattern analysis (i.e., analysis of the spatial locations of drops or other patterns of sprays) of the various outflows of the nozzles 60. Such analysis may result in data relating to actual outflow rates from the relevant nozzles 60 (or various outlets therefrom). Data from the pattern analysis may then be provided to the controller 34 in various ways (e.g., automatically, wirelessly, via manual input, and so on) for further processing. In some embodiments, multiple instances of the spray pattern generator 92 is used, such that flow rates for multiple nozzles 60 is measure relatively simultaneously. In some embodiments, the pattern generator 92 is moved successively between different nozzles 60 (e.g., on an automated cart (not shown)), such that flow rates for the nozzles 60 (or outlets therefrom) is determined in series.

Upon receiving the flow indicator signals (e.g., pressure indicators or flow rate indicators), the controller 34 compares one or more of the flow indicators to one or more reference values, in order to evaluate aspects of the relevant flow (e.g., the outflow from various of the nozzles 60). This is useful, for example, in order to identify whether actual nozzle outflows (or other aspects of system performance) appropriately correspond to desired nozzle outflows (or other aspects of system performance).

Appropriate reference values are determined in various ways. In some embodiments, reference values may indicate a default, uniform flow rate (or pressure) for the nozzles 60 (or a subset thereof), as may correspond to relatively uniform outflows through each of the nozzles 60 and relatively uniform distribution of spray along the entire boom assembly 32 (or portion thereof). As such, for example, a common (e.g., default) reference value is compared to flow indicators for each of the relevant nozzles 60.

In some embodiments, other reference values are used. As one example, an operator may input reference values indicating desired outflow rates (or corresponding other parameters) at particular nozzles 60 or sections of the boom assembly 32. In some embodiments, such desired outflow rates is uniform across all nozzles 60 or the entire boom assembly 32 (or section thereof). In some embodiments, such desired outflow rates may not necessarily be uniform across all nozzles 60 or the entire boom assembly 32 (or section thereof).

As another example, particular target (e.g. particular non-uniform) outflow rates from the nozzles 60*a* (or other parameters) are determined for a particular operation or operating condition. For example, one set of target outflow rates is specified for operation on a sideways slope of a particular slope, another set of target outflow rates is specified for certain field or environmental conditions, and so on. Particular reference indicators for the respective nozzles 60 may then be determined accordingly. A mapping can be performed to store the location (e.g. from GPS signals) of the field with the equalized spray offsets associated with the spray nozzles for that location in the field. The mapping is subsequently used to determine a correction to the pulse width signal for each nozzle or boom section to release a more optimal amount of fluid at that location in the field.

In some embodiments, target outflow rates (or other parameters underlying a reference value) are specified in absolute terms, such that, for example, a set target outflow rate is specified for each relevant nozzle. In some embodiments, target outflow rates (or other parameters) are specified in relative terms, such that, for example, a relative ratio (e.g., 1:1) of outflow rates is specified for different nozzles. Such a ratio may then be converted to absolute outflow rates, as appropriate, depending on the total amount of material that is to be distributed via the nozzles.

Based upon the comparison of reference values with determined flow indicators, the controller 34 may determine a deviation of or difference between actual nozzle performance from a target value. During vehicle operation, factory testing, etc., the difference is minimized. For example, the difference is monitored and adjustments are made until the difference is less than 10 to 15 percent. In some embodiments, based upon comparing a reference flow or pressure value to a measured flow or pressure value for the nozzles 60, the controller 34 may determine that an actual (e.g., current) outflow rate from one of the nozzles 60 (or outlet thereof) deviates from a target outflow rate. For example, where the determined flow indicator includes an indicator of a current outflow rate from the nozzle 60*a*, this current outflow rate is compared to a target outflow rate for the nozzle 60*a* (e.g., a target rate corresponding to uniform flow across all of the nozzles 60*a* through 60*h*) in order to determine whether the current outflow rate deviates from the target outflow rate. Similarly, where the determined flow indicator includes an indicator of current pressure at the nozzle 60*a*, this current pressure is compared to a target pressure at the nozzle 60*a* (e.g., as may correspond to relatively uniform outflow rates for all of the nozzles 60*a* through 60*h*, for a particular state of the pump 48 or other system components), in order to determine whether the current pressure deviates from the target outflow rate.

Based upon determining that an actual outflow rate (or other flow indicator) deviates from a target outflow rate (or other reference value) for one of the nozzles 60 (or for particular sets of the nozzles 60), various flow control parameters is determined. In some embodiments, a flow control parameter may include a particular aspect or profile of a control signal for a particular control valve. For example, a flow control parameter for the valve 60*a* may include a PWM profile (or aspects thereof), control signal timing, or other aspect of a control signal for control of one or more of the valves 72*a* and 74*a*. Similarly, a flow control parameter for the valve 60*c* may include a PWM profile, control signal timing, or other aspect of a control signal for control of one or more of the valves 72*a*, 74*c* and 74*cc*. In some embodiments, a PWM profile for a particular valve (e.g., the valve 72*a*) is determined to exhibit a different offset to pulsation amounts than another PWM profile for a different valve (e.g., the valve 74*a*).

Example flow control parameters are determined to correspond to outflow rates for the fluid outflows that are substantially equal, respectively, to a target outflow rate. In this way, for example, a deviation from a desired outflow rate for one of the nozzles 60 (or a set of multiple nozzles 60) is corrected. Accordingly, determining flow control parameters as described herein is useful in various circumstances, including during initial equalization of the sprayer 20 (e.g., to determine default flow control parameters for uniform or other nozzle outflow) or during subsequent equalizations (e.g., to identify and correct deviations from target flow, as is due to worn, clogged, or otherwise affected nozzles or other flow devices). As noted above, a target outflow rate for the system of FIG. 3 may correspond to relatively uniform outflow rate for each of the nozzles 60a through 60h, or may correspond to different outflow rates for different ones of the nozzles 60a through 60h.

In some embodiments, the determined flow control parameters are initial flow control parameters for a system. For example, the equalization method described herein is useful during initial setup or equalization of the sprayer 20, in order to determine initial (e.g., default) flow control parameters for operation of the sprayer 20.

In some embodiments, the determined flow control parameters represent updated flow control parameters with respect to predetermined or otherwise pre-existing flow control parameters. For example, where default (or other) flow control parameters have already been implemented for the sprayer 20, the disclosed equalization method is used to determine updated flow control parameters for the sprayer 20. This is useful, for example, to adjust system performance to account for wear or damage to particular nozzles 60 (or other components), to facilitate particular in-field operations, or address particular operating conditions and to provide a desired spray profile for the collective set of nozzles 60.

In some embodiments, flow control parameters for flow through certain of the nozzles 60 is determined to be equal to existing (e.g., current) flow control parameter for flow through those nozzles 60. In such a case, the determined updated flow control parameters may remain equal to the existing flow control parameters. For example, where a target outflow rate for the nozzles 60 corresponds to uniform outflow rates along the entire boom section 50, updated flow control parameters for certain of the nozzles 60 that already exhibit the target outflow rate is determined to be equal to existing flow control parameters for those nozzles 60.

The set of flow control parameters for control of outflow from all of the nozzles 60 (or a subset thereof) is collectively included in (or otherwise inform determination of) a set of "flow settings" for the nozzles 60 (or for the sprayer 20 as a whole). In some embodiments, flow settings may include other information, in addition to the determined flow control parameters, such as pump power information, bulk outflow targets, and so on.

Once flow control parameters for an appropriate set of nozzles 60 have been determined, the collective flow settings including (or otherwise informed by) those flow control parameters is implemented, in order to control spraying operations of the sprayer 20 (e.g., to implement a particular spray profile). For example, where flow control parameters are determined in an initial equalization for the sprayer 20, the flow settings corresponding to those flow control parameters is established as default flow settings for the sprayer 20. During operation, unless otherwise modified, these default flow settings may accordingly be used to control outflow of fluid from the various nozzles 60. For example, a PWM signal 94 is determined by the controller 34 based upon particular flow settings and the signal 94 is relayed to various nozzles 60 in order to control outflow rates from the nozzles 60.

In some embodiments, determined flow settings may update or replace default flow settings. For example, where in-field conditions, worn nozzles or valves, or other factors cause actual nozzle outflow rates to deviate from target outflow rates, updated flow settings (and corresponding pulse width modulation) is determined to replace the current (e.g., default) flow settings and thereby provide the desired outflow rates. A similar procedure is to replace the default flow settings by other flow settings such as when the sprayer 20 is traveling on a hill or at a tilt. For instance, a portion of the tilt settings is added to the default flow settings based on the amount of tilt. In some embodiments, a different set of calibration values or settings are used based on the size of the spray tips or type of fluid used (e.g. fluids with different specific gravity or chemical densities).

In some embodiments, default flow settings may correspond to relatively uniform outflow for each of the nozzles 60. Accordingly, implementing default flow settings may sometimes result in relatively uniform distribution of material by the sprayer 20 along the entire boom assembly 32. In other implementations, other default flow settings may alternatively (or additionally) be used. In some embodiments, the determined flow control parameters may not correspond to uniform outflow rates for the nozzles 60. Accordingly, implementation of the corresponding flow settings may not result in uniform outflow rates along the entire boom assembly 32.

In some embodiments, the method of determining and implementing flow settings for the sprayer 20 is executed for multiple flow conditions or vehicle configurations such as nozzle tip size or spray fluid specific gravity. For example, a first set of flow control parameters (and corresponding flow settings) is determined for the sprayer 20 for a first total outflow rate (e.g., a first gallons per acre ("GPA") spray rate) and a second set of flow control parameters (and corresponding flow settings) is determined for the sprayer 20 for a second total outflow rate (e.g., a GPA spray rate). One of the flow settings may then be implemented, depending on the GPA actually implemented for a given spraying operation.

In some embodiments, the method of determining and implementing flow settings for the sprayer 20 may include determining flow indicators for multiple vehicles. For example, flow indicators and corresponding flow control parameters is determined for the sprayer 20, as well as multiple other (similar) sprayers. Flow control settings for all of the sprayers, including the sprayer 20, may then be collectively determined based on an averaged (or other) combination of the flow control parameters (or corresponding flow control settings) for each of the sprayers. This is useful, for example, in order to establish default flow control settings for an entire vehicle line, with the use of multiple instances of the vehicle tending to eliminate the effects of slight equipment and performance variations between the individual vehicles.

Figure 4A:
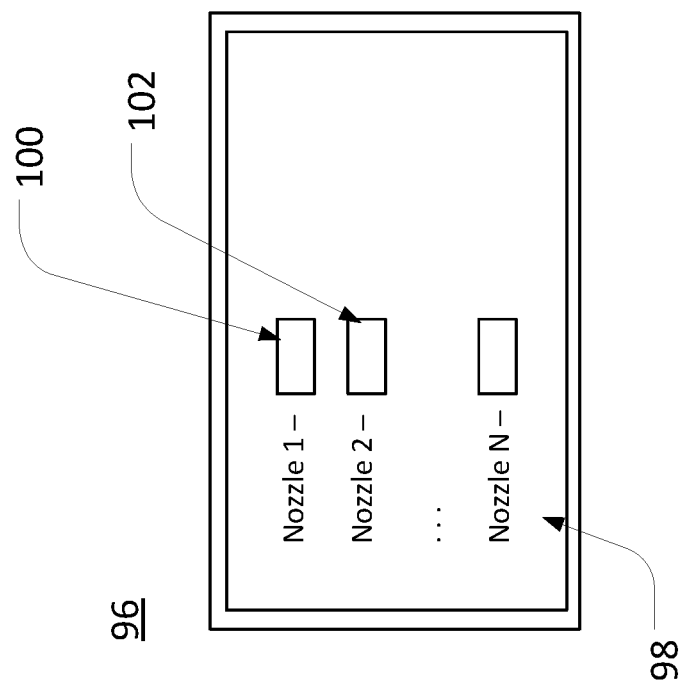
FIGS. 4A and 4B are schematic views of example user interfaces for use with the equalization method of FIG. 3.

In some embodiments, various aspects of an equalization operation are executed based upon operator input. Referring also to FIG. 4A, for example, an input device such as a touchscreen display 96 is included on or associated with the sprayer 20. During an equalization operation, an operator may use the display 96 to input and review relevant information. For example, during an in-field equalization, an operator may manually (or otherwise) measure the outflow rate for various of the nozzles 60 (or other data) and may then input the measured rates (or other data) into corresponding points on the input interface 98, and enter such data via the touchscreen display 96. Entries of an outflow rate for a first nozzle is input into space 100, for example, an outflow rate for a second nozzle is input into the space 102, and so on. The controller or processing circuits associated with the display 96 has memory circuits to store the profiles for each particular boom configuration. Each profile is associated with various physical makeup of the system, boom (e.g. length, droop), plumbing (e.g. length, I.D., number of segments, location of where the fluid enters), hoses (e.g. thickness, I.D.), nozzles (e.g. number of them, location on the plumbing), and vehicle (e.g. configuration of the center frame, suspension), all of which may be categorized as "geometry" of the spray or boom assembly. In some embodiments, in field calibration may be used to correct or revise factory calibration defaults, but the embodiments also allow resetting the nozzle flow controls to factory defaults.

An example of operator input may occur after the farmer or operator has used the spray system for a period of time ("usage consequence"). There may be chemical buildup, the plumbing may warp or expand from being in the hot sun, and hoses may be a little pinched, and so on. The factory default settings for the offsets correlated to the performance difference such as flow rate out of each nozzle will likely need to be updated. If the operator tries to equalize the spray system so that each nozzle delivers, say, one liter per minute, the offsets for each nozzle may need to be adjusted. The farmer may perform a catch test and input his results through the display 96 or run the equalization instructions stored in the controller 34 or processing circuits that operate the sensors for flow rate detection.

In some embodiments, the outflow rates input into the interface 98 is treated by the controller 34 as relevant flow indicators and automatic (or quasi-automatic) equalization of outflow through the nozzles 60 may proceed accordingly (e.g., as described above). In some embodiments, the operator may provide additional input in order to inform the determination of relevant flow settings. For example, referring also to FIG. 4B, a review interface 104 may graphically (or otherwise) display the flow indicators (or associated parameters) that were input by the operator via the interface 98 (or otherwise received or determined). For example, as depicted, the interface 104 includes various bars 106, 108, and so on to represent the outflow rates that were input by an operator via the interface 98. Using this information, and potentially by manipulating the representations on the interface 104 (e.g., by manipulating the various bars 106, 108 and so on to exhibit different heights corresponding to different outflow rates), the operator may then specify target outflow rates for the various nozzles. The controller 34, for example, may then determine appropriate PWM (or other) signals for control of the various valves of the boom assembly 32, in order to achieve the desired outflows.

Certain equalizations of spray systems include initial or in-field (e.g., dynamic) determinations of flow settings based at least partly on determination of the tilt of the relevant system (or subsystem). The operations include comparing determined and reference values, determining appropriate flow control parameters and flow settings.

Referring also to FIG. 5, another example boom assembly may include a boom section 150, with a feed pipe 166 delivering material to a spray pipe 168. The spray pipe 168, in turn, may deliver material to various nozzles 160*a* through 160*d* arranged along the spray pipe 168, each of which is equipped with a corresponding control valve 174*a* through 174*d* and flow or pressure sensor 178*a* through 178*d*. Other sensors and valves may also be included, such as a flow or pressure sensors 176*a* and 176*b* and a control valve 172. A controller 134 is in communication with the various valves 172 and 174 and the various sensors 176 and 178, as well as with a GPS device 136, and various other devices.

Flow settings for the boom section 150 are adjusted (including via initial equalization) based on a determined degree of tilt of the boom section 150. In some embodiments, the GPS device 136 (or other tilt-measurement device) may determine a degree of tilt for the boom section 150 (or related body) and may provide an indicator of the tilt to the controller 134. For example, the GPS device 136 may determine a degree of roll of the boom section 150, a sprayer vehicle supporting the boom section 150, or another relevant body, and may provide the degree of roll (or an indicator thereof) to the controller 134. Based upon the received tilt information (e.g., a degree of roll), the controller 134 may then determine one or more tilt-updated flow control parameters for one or more of the nozzles 160, and may determine tilt-updated flow settings (e.g., PWM signals 194 for control of the various valves 174) reflecting the tilt-updated flow control parameters.

In some embodiments, each tilt-updated flow control parameter provide for a tilt-compensating rate for the fluid outflow through the corresponding nozzle. One of the effects that the nozzle equalization addresses is due to a pressure differential along the boom (fluid pipe) on a side hill or uneven ground. There are possible secondary effects, such as due to vehicle exhaust air flow or the wind that causes spray drift. If enough fluid drifts away, then it is not landing on the desired location. The spray drift from the nozzles behind the sprayer is not necessarily uniform; for example, the nozzles in the center of the boom are protected from the wind by the vehicle, whereas the nozzles on the outer boom sections are not. For another example, where tilting of the boom section 150 results in certain nozzles (e.g., the nozzle 160*d*) being closer to the ground than other nozzles (e.g., the nozzle 160*a*), as indicated in FIG. 3 by distances 162 and 164, more fluid may be lost to spray drift (e.g., windborne) after exiting the higher nozzle (e.g., the nozzle 160*a*) than after exiting the lower nozzle (e.g., the nozzle 160*d*). Accordingly, it is possible to modulate and adjust the PWM signals controlling the different nozzles, e.g. a lower outflow rate for the lower nozzle (e.g., the nozzle 160*d*) than the higher nozzle (e.g., the nozzle 160*a*) while maintaining a relatively uniform actual application rate of the material to the field for both of the nozzles. In such a case, for example, the controller 134 may usefully determine updated flow settings for the boom section 150 that cause a lower outflow rate for lower nozzles (e.g., the nozzle 160*d*) than for higher nozzles (e.g., the nozzle 160*a*). Accordingly, in this and other implementations, the determined tilt-updated flow settings may reflect a tilt-updated outflow rate that is different, for a given one of the nozzles 160, from a default (or other current) outflow rate.

In some embodiments, in addition to the side hill (or other terrain level) compensation, there are other effects to include in the pulse width modulation calibration to equalize the output of the spray nozzles. For example, at the end of each row, turn compensation effects may be added to fluid distribution equalization or side hill compensation. The spray nozzles at the outermost part of the turn covers more ground than the spray nozzles at the innermost part of the turn. So the flow rate of the outermost nozzles would be proportionally increased. Alternatively, under turns, the centripetal force effects of spraying can be equalized from nozzle to nozzle by revising the pulse width of the signals controlling the solenoid valves that release fluid in the nozzle bodies. The centripetal force is greater on the fluid in the nozzles at the outermost end of the boom as compared to the innermost end. To equalize the effect of the centripetal force or the turn compensation, the linear speed of and distance traveled by each nozzle body are included in the calculations to proportionally adjust either the flow rate or the fluid pressure of the different nozzle bodies along the boom.

Figure 4B:
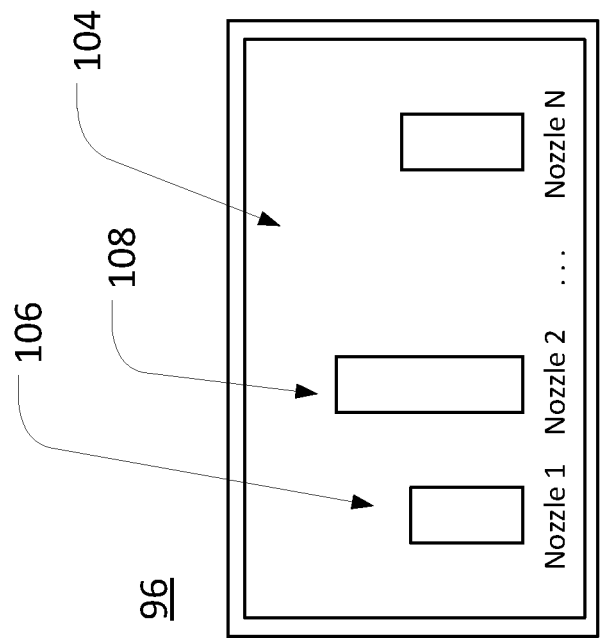
Figure 5:
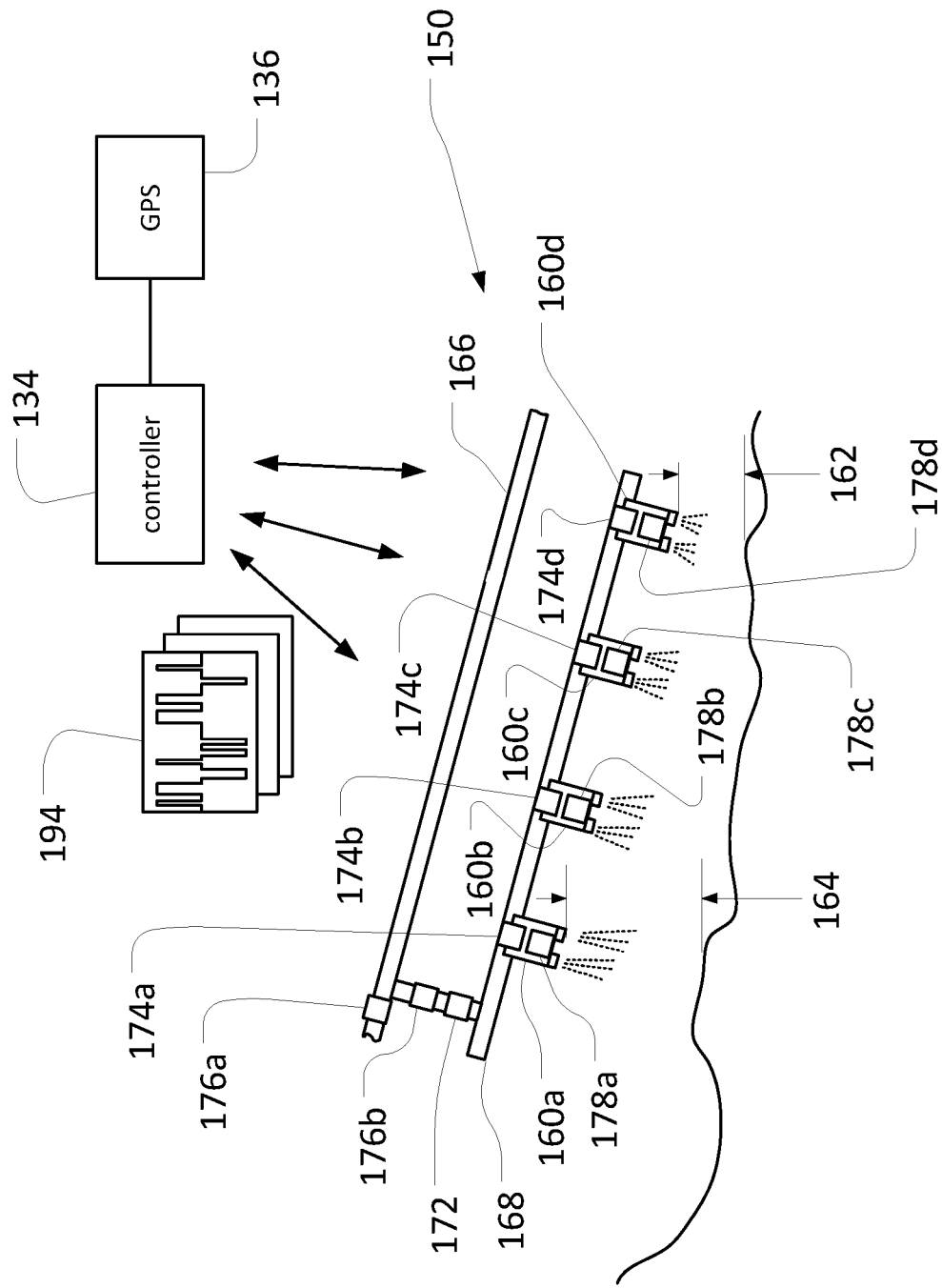
FIG. 5 is a schematic view of an example equalization operation for the fluid system of FIG. 3.

In some embodiments, determination of tilt-updated flow settings is based upon physical capture or other measurement of outflow rates for the relevant system. For example, a receptacle such as the receptacle 90 (see FIG. 3) or a measurement device such as the pattern generator 92 (see FIG. 3) is used to determine flow rate indicators for various of the nozzles 160 and these flow rate indicators is used by the controller 134 in determining tilt-updated flow control parameters and flow settings for outflows from the nozzles 160. In some embodiments, determination of tilt-updated flow settings is based upon information from various sensors, such as the flow or pressure sensors 176 and 178. In some embodiments, determination of tilt-updated flow settings is based upon operator input, as described, for example, with respect to FIGS. 4A and 4B.

In some embodiments, determination of tilt-updated flow settings is undertaken during in-field operation or maintenance. In some embodiments, determination of tilt-updated flow settings is undertaken during an initial (or other) equalization of the relevant system. For example, during an in-factory equalization of the sprayer 20, tilt-updated flow settings is determined for a number of degrees of tilt and for a number of different GPA values. These various tilt-updated flow settings may then be stored as default tilt-updated flow settings, which is retrieved and implemented by the controller 134 when a corresponding in-field tilt (and GPA) value is determined.

The computer device or computer readable medium includes electronic circuits, logic processors, and CPU integrated circuit chips that have been programmed with instructions and when powered up to execute the instructions. More specific examples of the computer memory devices would include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium is any tangible medium that can contain, or store a program for use by or in connection with the instruction execution system, apparatus, or device.

Finally, the orientation and directions stated and illustrated in this disclosure should not be taken as limiting. Many of the orientations stated in this disclosure and claims are with reference to the direction of travel of the vehicle (e.g. rearward is opposite the direction of travel). But, the directions, e.g. "behind" are merely illustrative and do not orient the embodiments absolutely in space. That is, a structure manufactured on its "side" or "bottom" is merely an arbitrary orientation in space that has no absolute direction. Also, in actual usage, for example, the boom equipment and nozzles are operated or positioned at an angle because the implements may move in many directions on a hill; and then, "top" is pointing to the "side." Thus, the stated directions in this application are arbitrary designations.

In the present disclosure, the descriptions and example embodiments should not be viewed as limiting. Rather, there are variations and modifications that are made without departing from the scope of the appended claims.

What is claimed is:

1. A method of equalizing a spray system for an agricultural sprayer having (i) a boom assembly with a plurality of nozzles and (ii) a control system configured to implement predetermined flow settings for the spray system corresponding to respective predetermined outflow rates or pressures for fluid outflows through the plurality of nozzles, the method comprising:
   measuring an output flow rate or fluid pressure for each of the nozzles;
   determining an amount of tilt of the boom assembly with respect to a reference frame;
   associating the amount of tilt with the output flow rate or fluid pressure for each of the nozzles;
   determining tilt-updated flow settings for the spray system based on the output flow rate or fluid pressure for each nozzle of the plurality of nozzles;
   storing the tilt-updated flow settings in a spray profile for later use during a spray operation; and
   at least partly replacing the predetermined flow settings by the tilt-updated flow settings for the spray system.

2. The method of claim 1, wherein the predetermined flow settings for the spray system include factory default settings for the spray system, and the factory default settings being determined from a geometry of the boom assembly and a physical arrangement of the nozzles.

3. A method of equalizing a spray system for an agricultural sprayer having (i) a boom assembly with a plurality of nozzles (ii) a control system configured to implement predetermined flow settings for the spray system corresponding to respective predetermined outflow rates or pressures for fluid outflows through the plurality of nozzles, the method comprising:
   determining an amount of tilt of the boom assembly with respect to a reference frame;
   associating the amount of tilt with an output flow rate or a fluid pressure for each nozzle of the plurality of nozzles;
   determining tilt-updated flow settings for the spray system based on the output flow rate or fluid pressure for each nozzle of the plurality of nozzles; and
   storing the tilt-updated flow settings in a spray profile for later use during a spray operation; and
   at least partly replacing the predetermined flow settings by the tilt-updated flow settings for the spray system.

4. The method of claim 3, wherein the predetermined flow settings for the spray system are based on a geometry of the boom assembly or a physical arrangement of the nozzles.

5. A method of equalizing a spray system for an agricultural sprayer having (i) a boom assembly with a plurality of nozzles (ii) a control system configured to implement predetermined flow settings for the spray system corresponding to respective predetermined outflow rates or pressures for fluid outflows through the plurality of nozzles, the method comprising:
   determining an output flow rate or fluid pressure for each nozzle of the plurality of nozzles;
   determining an amount of tilt of the boom assembly with respect to a reference frame;
   associating the amount of tilt with the determined output flow rate or fluid pressure for each nozzle of the plurality of nozzles;
   determining tilt-updated flow settings for the spray system based on the determined output flow rate or fluid pressure; and
   storing the tilt-updated flow settings in a spray profile for later use during a spray operation, wherein:
a spray pattern of fluid dispensed from each nozzle of the plurality of nozzles is adjusted based on the spray profile and an associated signal waveform,
adjustment of the spray pattern comprises dynamically switching between at least two nozzle outlets or proportionally adjusting an output of each of the at least two nozzle outlets relative to one another,
the spray profile includes default flow settings for each nozzle of the plurality of nozzles, and
the default flow settings for at least one nozzle stored in the spray profiles is updated in response to the measured outflow rate exceeding or falling below a default reference value for the at least one nozzle.

6. The method of claim 5, further comprising at least partly replacing the predetermined flow settings by the tilt-updated flow settings for the spray system.

7. The method of claim 5, wherein the predetermined flow settings for the spray system include factory default settings for the spray system, and the factory default settings being determined from a geometry of the boom assembly and a physical arrangement of the nozzles.

\* \* \* \* \*